June 15, 1926.
P. L. SCOTT
1,589,246
PROCESS OF PREPARING FUEL FOR INTERNAL COMBUSTION ENGINES
Filed Jan. 3, 1922
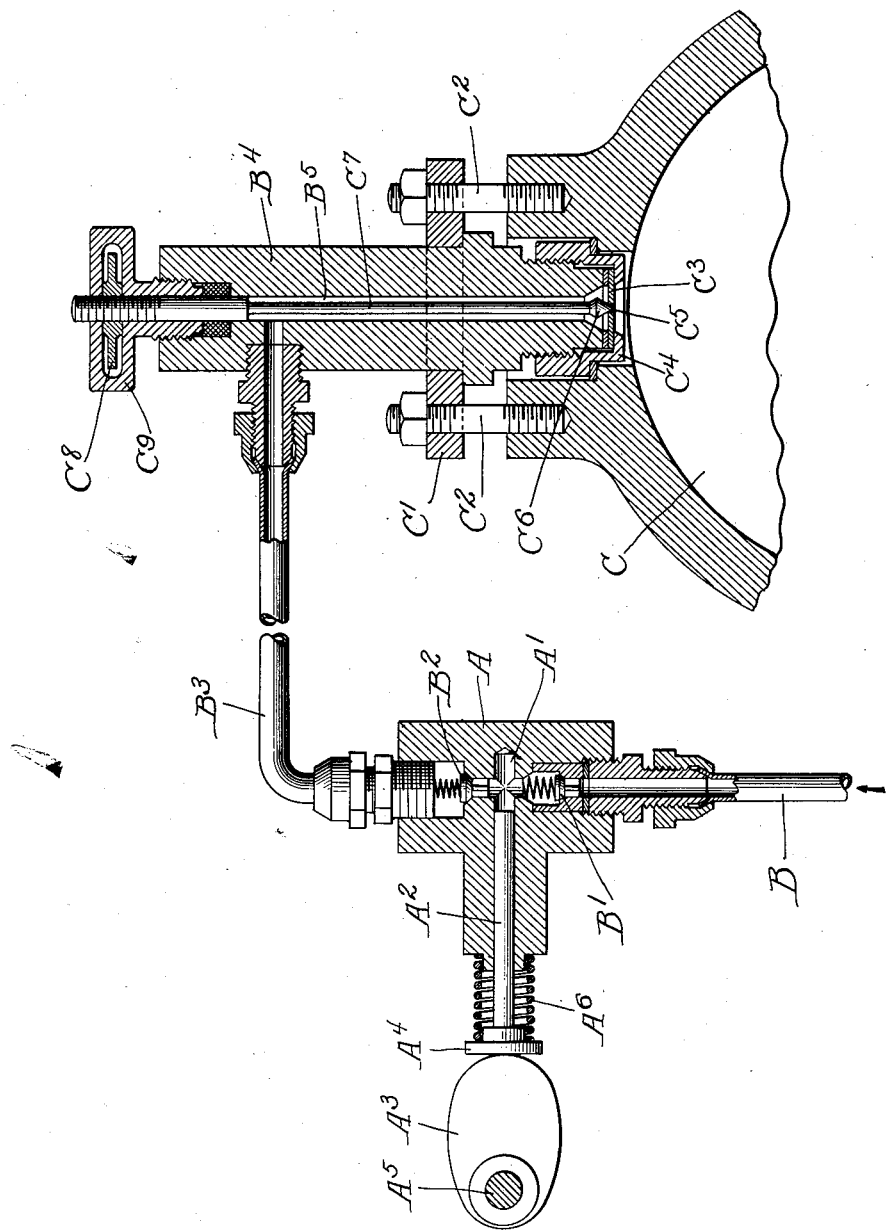
Witness:
Edward T. Wray.
Inventor:
Philip L. Scott.
by Parker & Carter
Attorneys.

Patented June 15, 1926.

1,589,246

UNITED STATES PATENT OFFICE.

PHILIP LANE SCOTT, OF CHICAGO, ILLINOIS, ASSIGNOR TO SUPER-DIESEL TRACTOR CORPORATION, OF LA PORTE, INDIANA, A CORPORATION OF NEW YORK.

PROCESS OF PREPARING FUEL FOR INTERNAL-COMBUSTION ENGINES.

Application filed January 3, 1922. Serial No. 526,753.

My invention relates to a process of atomizing liquids, and more particularly fuel for combustion in internal combustion engines or elsewhere, but it is applicable to processing liquids generally. The process consists in changing the physical state of the fuel from that of a normal liquid to a vaporous condition by mechanical means only. My process for purposes of illustration is described as applied to an internal combustion engine.

Three means of preparing fuel for combustion in engines are recognized. First, evaporation resulting from reduced pressure over the surface of a liquid. This is applicable only to relatively volatile fuels and is characteristic of the common carbureting gasoline engine. Second, atomization of the fuel by substantial positive pressures and the disruptive and carrying effect of some secondary substance, such as a gas under very high pressure, applied to the liquid, and expanding greatly in passing through the atomizing orifice, carrying the liquid fuel along. This requires the input of energy mechanically into the secondary medium where it resides as potential pressure energy until motion takes place, when kinetic energy is imparted to the liquid and also considerable energy absorbed in overcoming cohesive forces of the liquid, i. e., tearing it apart. Third, a combination process including atomization by direct mechanical application of energy plus boiling or vaporizing rather coarse liquid particles, i. e., the addition of thermal energy to the already partly processed fuel. This thermal energy comes from hot surfaces or gases affecting the partially atomized fuel. This method is characteristic of engines commonly described as "semi-Diesel".

In my method, which differs from each of these cited, I propose to eliminate the energy transfer through secondary means whether gaseous mediums or heated surfaces, and to rely solely upon a mechanical action to accomplish the complete separation of the fuel for immediate combustion.

It is recognized that the broad difference between a normal liquid and its vapor or gas consists in the relative activity of the molecules. The molecules of a gas move very much faster than the molecules of a liquid. This increased activity represents increased energy and to obtain increased activity, energy must be supplied. A common example is the application of heat to a liquid to cause it to pass into a gaseous state. There is no absolutely sharp or definite transition between the liquid and the gaseous state. On the boundary line, the vaporous condition, the average activity of the molecules is much less than in the dry gas. The molecules collect in very small groups and in many natural phenomena this is aided by some nucleus such as tiny dust particles. The little particle so formed is still of such small size that further collection is a very slow process and which usually requires further absorption of energy. This condition is represented by a cloud. When the cloud is chilled (energy absorbed) further collection takes place and the substance appears in its true liquid form in particles of appreciable size.

If a liquid can be disrupted into exceedingly small particles and exceedingly high velocities imparted to these particles, a condition approaching a gaseous condition can be obtained, in which the particles will contain a relatively small number of molecules, and in which the tendency to collect into appreciable drops will be largey reduced. When in this condition the fuel is ready for immediate combustion.

In my process this may be done by passing the liquid through exceedingly minute openings and imparting to the resulting jet exceedingly high velocities and causing the jet to separate and diverge on issuance from the opening. The liquid is compelled to pass through an opening or slit of straight, circular, or other form, which may be from .0001 to .001 inch at its smallest dimension. In a given time a sufficient quantity of liquid is passed through such opening so as to produce velocities which may be in the neighborhood of one thousand feet per second. The energy available to drive the liquid through these small openings at such velocities is provided by hydraulic pressure applied to the liquid by a pump, a purely mechanical means. The theoretical velocity which can be imparted to a fluid is directly dependent on the pressure head. $V = \sqrt{2GH}$, in which H is the head in feet of the substance and G is the acceleration of gravity. The actual velocity will depend on the efficiency of the mechanism and will be reduced greatly by unnecessary restriction to the passage of the liquid. To obtain the maximum efficiency, restrictions in the system have been avoided, up to the minute openings mentioned, i. e., the atomizing or transferring orifice. Pressure capable of theoretical velocities in excess of one thousand feet per second for liquids of specific gravity of .85 are applied to the liquid which then passes through an opening, the width of which is equivalent to but a few hundred molecules placed side by side, the liquid leaving the opening with velocities comparable to the velocities of the molecules of a gas of this liquid.

The result of this processing is first to produce particles containing but a relatively few molecules, and second, to cause these particles to travel with velocities comparable to molecular velocities of a gas at standard conditions. The liquid is then not in normal state but in a vaporous condition which approaches the gaseous condition ideal for combustion.

The effectiveness of the processing of the fuel as far as combustion is concerned is indicated by the time elapsing between the appearance of a processed portion of the fuel in the combustion chamber and its reaction with the air, assuming that the fuel is introduced directly into unfoul air suitable for combustion. In the operation of all injection engines there is some "lag" between the time of introduction of the prepared fuel and its combustion. It is necessary to have this "lag" as short as possible in order that the combustion may be perfectly responsive to injection and subject to exact control. In the true Diesel engine this "lag" is exceedingly short. There is however an unnecessary delay caused by the refrigerating effect of the injection air, representing an appreciable portion of the total air charge, and dropping several hundred pounds in pressure. In the so-called "semi-Diesel" the "lag" may be excessive. The extreme condition which is common in the earlier forms, is completion of the introduction of the fuel before any reaction takes place. The fuel is so insufficiently processed as regards its immediate reaction with the air that ignition and combustion will not take place at all until the fuel is further acted upon, over an appreciable time period, by the heat, either in a warm or hot surface, or in the air charge itself. When the reaction does start under these conditions it is beyond control, and usually follows the constant volume cycle in an engine.

Fuel prepared by my process is in a condition to react immediately with the air charge in an engine, if the temperature is above the ignition point of the fuel, and the burning, during the injection period is responsive to the rate of the injection permitting accurate control that is, the fuel immediately ignites and burns progressively as it is discharged into the engine cylinder. The condition is that characteristic of the Diesel engine but without the refrigerating effect of the injection air.

The term "immediate combusition" as used is intended to describe the almost instantaneous ignition and prompt response of the combustion to injection conditions, whereby control of the conditions effecting combustion is possible.

I have diagrammatically illustrated in my drawings, a suitable specimen or sample apparatus for carrying out my process or accomplishing my result, but it will be understood, of course, that an almost infinite variety of mechanism can be worked out for the carrying out of this process and the showing which I make is merely the showing of a diagrammatic apparatus based on an operative successful engine which carries out my process, the details of which will be from time to time separately disclosed in other applications in the process of preparation.

My invention is illustrated in the accompanying drawings wherein is shown an assembly in part elevation and part section of an apparatus adapted to carry out my invention.

A is a pump housing. It contains a pump cylinder A' in which a plunger $A^2$ is caused to reciprocate by rotation of the cam $A^3$ engaging a tappet $A^4$. Any suitable means not here shown may be used to rotate the shaft $A^5$ to carry with it the cam. The plunger is returned on the suction stroke by the spring $A^6$.

B is an intake pipe discharging past the check valve $B^1$ and into the pump cylinder A'. $B^2$ is a discharge check valve adapted to close the discharge pipe $B^3$ against return of the liquid on the suction stroke. This pipe $B^3$ discharges into a spray member $B^4$ communicating with the central bore $B^5$ therein.

The spray member $B^4$ is held in position so as to discharge into the combustion chamber or engine cylinder C by means of a yoke $C^1$ and holding bolts $C^2$. $C^3$ is a nozzle plate closing the lower end of the bore $B^5$ held in position by a cap $C^4$. This nozzle plate is apertured as at $C^5$ and the aperture is normally closed by a needle valve $C^6$ on the valve rod $C^7$. The hand wheel $C^8$ rotating in the yoke $C^9$ is screw-threaded on the valve stem $C^7$ and may be rotated to force the needle valve down against the plate $C^3$ to close the aperture, and exercise an initial tension on the plate which tension may be adjusted at the will of the operator.

When the pump starts its operation, if it starts with the cylinder filled, the inward movement of the pump plunger forces the liquid under high pressure through the pipe into the spray valve member and as soon as the pressure rises high enough to deflect the spray valve plate, opening takes place, and the rush of liquid takes place through the very minute valve opening between the edge of the aperture in the plate and the needle valve. In practice this opening will be from .0001 to .001 inch in width. The size of this hole of course may vary and the amount of opening between the pin and the valve disc may vary, depending on the characteristic of the engine or apparatus, the character of the oil, and the amount or quantity of oil being used and under ordinary conditions the parts are so proportioned with respect to the rate of pump travel that velocities of from 1,000 to 2,000 feet per second are imparted to the oil as it rushes out past the valve.

In my process I have found it advantageous to use velocities up to 1,500 feet per second. For general purposes a velocity of 1,000 feet per second is satisfactory, and probably preferable. I prefer to use a valve opening not greater than .001, although I have obtained satisfactory results using an opening which may be from .0001 to .003.

I claim:—

1. The process of preparing liquid fuel for combustion which consists in forcing the liquid under high pressure through an opening the width of which is not greater than three one-thousandths of an inch and imparting to it a velocity of not less than eight hundred feet per second.

2. The process of preparing liquid fuel for combustion which consists in forcing the liquid under high pressure through an opening the width of which is from one-ten-thousandth to one-one-thousandth of an inch and imparting to it a velocity of not less than eight hundred feet per second.

3. The process of preparing liquid fuel for combustion which consists in forcing the liquid under high pressure through an opening the width of which is from one-ten-thousandth to one-one-thousandth of an inch and imparting to it a velocity of from eight hundred to fifteen hundred feet per second.

4. The process of preparing liquid fuel for combustion which consists in forcing the liquid under high pressure through an opening the width of which is not greater than three-thousandths of an inch.

5. The process of preparing liquid fuel for combustion which consists in forcing the liquid under high pressure through an opening the width of which is from one-ten-thousandth to three-one-thousandths of an inch.

6. The process of treating liquid fuel to prepare it for immediate responsive combustion, which consists in acting upon the fuel by great hydraulic pressure and subdividing it while under said pressure into an exceedingly thin stream moving at very high velocities and releasing the thin stream into a region of lower pressure whereby the particles of fuel have their liquid characteristics so altered as to immediately ignite and burn progressively as discharged into an engine cylinder.

7. The process of converting a liquid into a vapor which consists in confining the liquid and forming said liquid by means of hydraulic pressure into a thin stream and causing liquid of said thin stream to be divided into separated particles having their normal relation to the atmosphere so changed as to float therein in a vaporous condition.

Signed at Chicago, county of Cook, and State of Illinois, this 30th day of December, 1921.

PHILIP LANE SCOTT.